United States Patent
Schmid

[15] 3,650,656
[45] Mar. 21, 1972

[54] APPARATUS FOR MAKING HOLLOW PLASTIC ARTICLES

[72] Inventor: Gunther Schmid, Stuttgart-Mohringen, Germany

[73] Assignee: Robert Bosch GmbH, Stuttgart, Germany

[22] Filed: June 13, 1969

[21] Appl. No.: 832,951

[30] Foreign Application Priority Data
July 27, 1968 Germany .................... P 17 79 306.5

[52] U.S. Cl. .................. 425/387, 425/DIG. 38, 425/395, 425/397, 425/403
[51] Int. Cl. .................................................. B29d 23/03
[58] Field of Search ............... 18/5 BB, 5 BM, 5 BH, 5 BT, 18/DIG. 38, DIG. 44, 5 BA, 5 BC, 5 BE, 5 BF, 5 BJ, 5 BK, 5 BN, 5 BP, 5 BR, 5 BS, 5 BU, 5 BZ; 65/230, 240

[56] References Cited

UNITED STATES PATENTS

| | | | |
|---|---|---|---|
| 2,336,821 | 12/1943 | Wadman | 18/5 B UX |
| 2,792,593 | 5/1957 | Hardgrove, Jr. | 18/5 BZ |
| 2,937,402 | 5/1960 | Pierce | 18/14 RR |

Primary Examiner—Robert D. Baldwin
Assistant Examiner—David S. Safran
Attorney—Michael S. Striker

[57] ABSTRACT

Selected portions of tubular thermoplastic parisons are heated from inside prior to introduction into the cavity of a blow molding unit. Steam which heats the parisons from inside is discharged by orifices provided in a hollow mandrel which is connected to a source of steam and extends with clearance through a hollow rotary shaft cooperating with a clamping device for parisons. The mandrel can be mounted for reciprocatory and/or rotary movement with reference to the shaft.

9 Claims, 1 Drawing Figure

Patented March 21, 1972 3,650,656
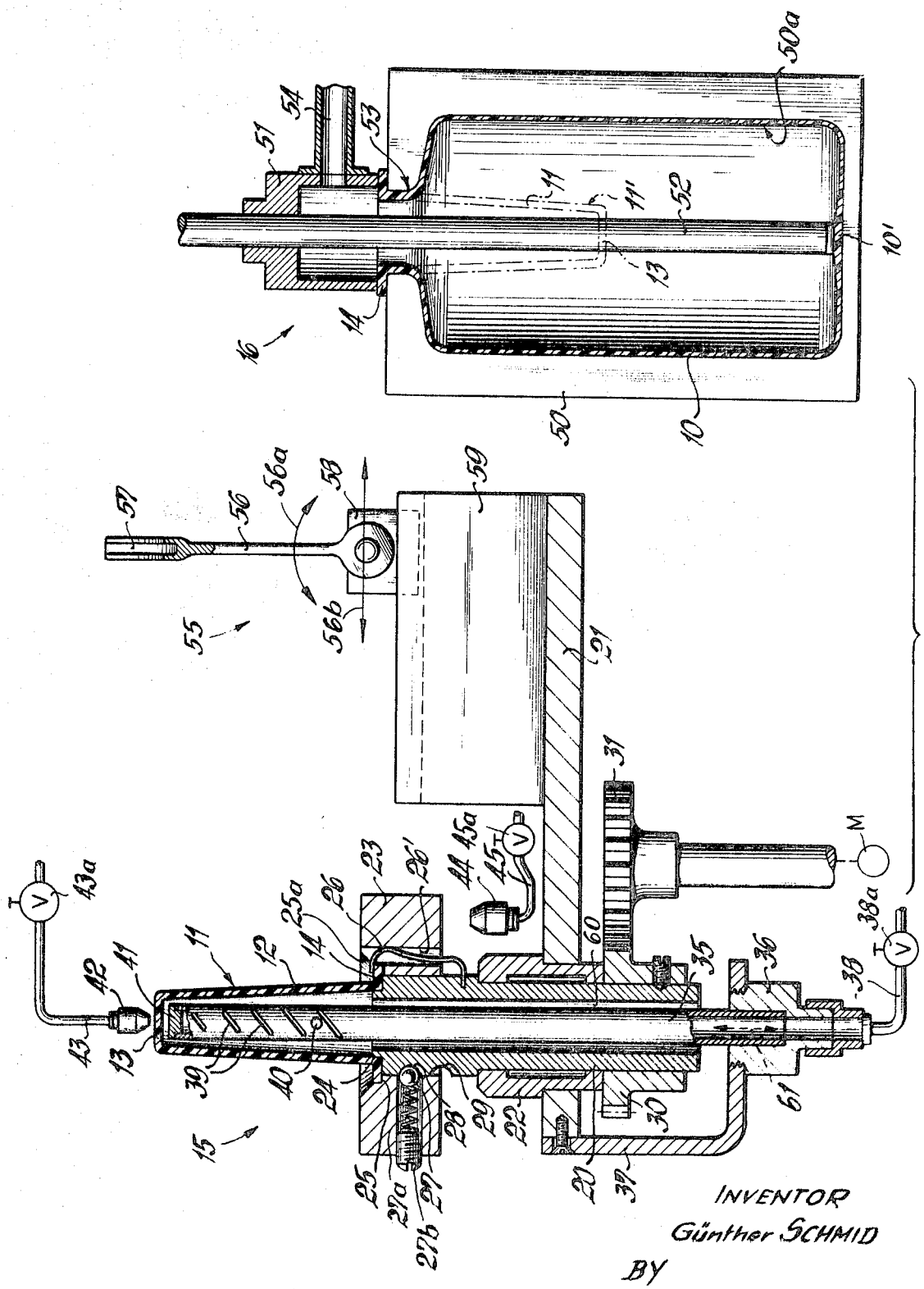
INVENTOR
Günther SCHMID
BY
his ATTORNEY

APPARATUS FOR MAKING HOLLOW PLASTIC ARTICLES

BACKGROUND OF THE INVENTION

The present invention relates to molding apparatus in general, and more particularly to improvements in molding apparatus of the type wherein the parisons are subjected to localized heating prior to entry into the molding station.

British Pat. No. 926,589 discloses a blow molding apparatus wherein parisons consisting of thermoplastic material are subjected to a plasticizing treatment during travel through a furnace. The parisons are mounted on a revolving disk which is conveyed through the furnace and is provided with a central passage for heating air as well as with an eccentrically mounted mandrel which supports a tubular parison. If the parison is to be subjected to a localized heating and plasticizing action, i.e., if certain part or parts or the parison are to be subjected to a more pronounced heating action than the remaining part or parts, the furnace is equipped with baffles which shield selected portions of revolving parisons from the heating medium. However, such mode of effecting localized heating of parisons is not entirely satisfactory because the heating medium circulates in the furnace and the baffle or baffles are unable to insure the formation of sharply defined boundaries between those portions of parisons which must be subjected to more and less intensive heating action. Also, the baffles cannot insure accurate heating of parts which are to be subjected to more pronounced and less intensive plasticizing action, i.e., the extent of plasticizing cannot be determined in advance with a desired degree of accuracy.

SUMMARY OF THE INVENTION

An object of my invention is to provide an apparatus for the production of hollow articles wherein each of a succession of discrete parisons can be subjected to identical heating or plasticizing action and wherein the localized heating of successive parisons can be effected with a presently unmatched degree of accuracy.

Another object of the invention is to provide a blow molding apparatus wherein the heating action to which the parisons are subjected can be regulated within a desired range and wherein the heating action can be completed within short intervals of time, in a small area, and by resorting to simple and compact instrumentalities.

A further object of the invention is to provide a device for localized heating of parisons which consist of thermoplastic material, particularly for localized heating of parisons immediately prior to transfer into a blowing station.

The invention is embodied in an apparatus for conversion of synthetic thermoplastic parisons into hollow articles, such as bottles or the like. The apparatus preferably converts tubular parisons into hollow articles by the blowing method and comprises a parison holding component, preferably a hollow upright rotary shaft which cooperates with a clamping device to hold a parison in inverted position so that the open end of the parison is adjacent to the upper end of the shaft, a heating medium supplying component which preferably includes a hollow mandrel having at least one orifice arranged to discharge steam or other suitable heating medium into the parison which is carried by the holding component, means for delivering the medium to the supplying component, and drive means for moving at least one of the components with reference to the other component while the orifice or orifices discharge heating medium against the internal surface of the parison. For example, the drive means can rotate the shaft, the clamping device and the parison with reference to the mandrel. However, it is equally possible to rotate the mandrel with reference to the shaft and parison, to rotate the shaft as well as the mandrel but at different speeds and/or in different directions, or to reciprocate the mandrel with reference to the rotating parison. In this way, selected portions of the parison can be subjected to a requisite heating treatment prior to transfer of the thus treated parison to a further station where the parison is converted into a bottle or the like, preferably by mechanical stretching and/or by a blowing fluid.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic partly elevational and partly sectional view of a blow molding apparatus which embodies one form of the invention.

DESCRIPTION OF THE PREFERRED EMBODIMENTS

The drawing illustrates a portion of an apparatus which is utilized to convert prefabricated cup-shaped parisons 11 into bottles 10 or analogous hollow plastic articles by the blow molding process. The parisons 11 can be produced by injection molding and consist of thermoplastic material, such as polyvinyl chloride, polystyrene, polyethylene or the like. Each parison 11 has an open end surrounded by an annular flange 14, a closed end formed by a bottom wall 13, and a conical shell or mantle 12 which flares from the bottom wall 13 toward the flange 14. The apparatus comprises basically a heating or tempering unit 15, a blowing unit 16, and a transfer unit 55 which serves to transport or convey heat-treated parisons 11 into the blowing unit. The construction of the blowing unit 16 is such that the flanges 14 undergo no deformation; they form the beads or flanges at the open tops of necks of finished articles 10.

The heating unit 15 serves to internally heat selected portions of parisons 11 with steam and to externally cool selected portions of parisons with air or another suitable gas. It comprises a rotary holding component or carrier for parisons 11, a stationary heating medium supplying component comprising a hollow mandrel 35 extending with clearance into the parison 11, drive means for rotating the carrier, means including a conduit 38 for delivering the medium to the supplying component, and support means for the carrier. The carrier includes a hollow upright shaft 20 and a clamping device 23 which cooperates with the shaft 20 to hold a parison 11 in inverted position during rotation with reference to the heating medium supplying component. The support means comprises a plate 21 and a bearing sleeve 22 which is mounted in the plate 21 and rotatably supports the shaft 20. The drive means comprises a pinion 30 which is affixed to the shaft 20 at a level below the plate 21, a driver gear 31 which meshes with the pinion 30, and a motor or another suitable prime mover (not shown) which rotates the gear 31. The clamping device 23 is a ring which is movable axially of the shaft 20 between two end positions which are determined by a detent structure including two notches 28, 29 in the peripheral surface of the shaft 20 a ball 27 biased by a spring 27a and arranged to extend into the notch 28 or 29. The bias of the spring 27a can be adjusted by a screw 27b. The outer diameter of the upper end portion of the shaft 20 in the interior of the clamping ring 23 approximates the maximum outer diameter of the shell 12 (in the region of the flange 14). The top face of the shaft 20 is formed with an annular groove 24 which can receive the radially inner part of the flange 14 whereby the outer part of the flange extends into an internal groove 25 of the clamping ring 23 when the latter assumes the upper end position which is shown in the drawing. The depth of the groove 24 equals the thickness of the flange 14 and the inner diameter of the groove 24 equals the inner diameter of the flange. The internal groove 25 of the clamping ring 23 is located at the lower end of a conical inlet 25a which tapers inwardly and downwardly from the upper end face of the clamping ring. The groove 25 is surrounded by a short cylindrical surface whose axial length equals the thickness of the flange 14 and whose diameter equals the maximum diameter of the flange. In the upper end position of the clamping ring 23, the bottom surface of the groove 25 is flush with the bottom surface of the groove 24, and these bottom surfaces abut against the underside of the flange 14. Thus, the flange 14 is flanked at three sides, namely, at the underside (by parts 20, 23), at the inner side (by the shaft 20) and at the outer side (by the clamping ring 23). The upper side of the flange 14 is engaged by four preferably equidistant leaf springs 26 (only one shown) which are installed in suitable cutouts 27 of the clamping ring 23 and whose upper ends overlie the flange in the upper position of the clamping ring. When the ring 23 is moved to the lower end position so that the ball 27 extends into the lower notch 29, the upper end portions of the springs 26 are disengaged from the flange 14 so that the latter can be withdrawn from the grooves 24 and 25.

The aforementioned heating medium supplying component comprises a stationary hollow mandrel 35 the lower end portion of which is affixed to a nipple 36 and the major part of which extends axially into the hollow shaft 20. The nipple 36 is affixed to the plate 21 by a suitable bracket 37 so that the plate supports the mandrel 35 in the illustrated position. A conduit 38 which supplies steam to the mandrel 35 contains a regulating valve 38a and is connected to a source of steam (not shown). The upper portion of the mandrel 35 extends beyond the upper end of the shaft 20 and beyond the clamping ring 23 and is provided with a set of suitably distributed and preferably helically extending medium-discharging orifices or slots 39. The length of these orifices preferably diminishes in a direction toward the bottom wall 13 of the parison 11, i.e., away from the upper end of the shaft 20. The width of all orifices 39 is preferably the same and they can (but need not) be arranged in such distribution as to heat a continuous length of the shell 12 in the region above the clamping ring 25. It is clear that the orifices 39 can be distributed at unequal intervals and that longer orifices can alternate with shorter orifices and/or that one or more orifices of greater cross-sectional area can alternate with one or more orifices of lesser cross-sectional area. This depends on the location of those parts of a parison 11 which require heating to a predetermined temperature while the shaft 20 and the clamping ring 23 rotate a parison with reference to the mandrel 35. The drawing further shows a diametrically extending stud or pin 40 which is installed in the mandrel 35 between the two lowermost orifices 39 and serves as a means for throttling the flow of heating medium upwardly toward the remaining orifices. Other types of throttling means can be employed with equal advantage and the mandrel 35 can be provided with two or more throttling pins 40. In this way, the operator can properly meter the amounts of heat which are transmitted to selected portions of a parison 11 which rotates with the shaft 20 and clamping ring 23. The upper end of the mandrel 35 is sealed by a suitable plug 41.

A nozzle 42 is mounted at a level above and coaxially with the bottom wall 13 of the parison 11 and has an orifice arranged to discharge a stream of cool atmospheric air or another suitable cooling fluid against the outer side of the bottom wall 13. The cooling fluid is supplied by a conduit 43 which is provided with a regulating valve 43a and can receive cooling air from a suitable compressor, not shown. The purpose of the nozzle 42 is to prevent heating and plasticizing of the central portion of the bottom wall 13 (see the central portion 10' of the bottom wall of the finished article 10 in the right-hand portion of the drawing).

A second nozzle 44 is adjacent to the upper side of the supporting plate 21 and has an orifice which can discharge cool air or other cooling fluid against the underside of the clamping ring 23 to thereby cool the flange 14. The nozzle 44 receives cooling fluid by way of a conduit 45 containing a regulating valve 45a and connected to a source of cooling fluid, for example, to the aforementioned compressor which supplies cooling fluid to the conduit 43.

The blowing unit 16 has a vertical axis which is parallel to the common axis of the shaft 20 and mandrel 35. This blowing unit 16 comprises a customary open and shut mold having two sections or halves 50 (only one shown) defining a mold cavity 50a whose configuration corresponds to the desired external configuration of the blow molded article 10 (e.g., a bottle). The unit 16 further comprises a blowing head 51 which receives a blowing fluid by way of a supply conduit 54. Still further, the blowing unit 16 comprises an axially reciprocable stretching ram 52 which extends axially through the blowing head 51 and into the cavity 50a of the mold. The cavity 50a communicates with an opening 53 which is defined by the mold sections 50 in closed position of the mold and is large enough to permit entry of the shell 12 and bottom wall 13 but is too small to permit entry of the flange 14. The diameter of the opening 53 preferably approximates or equals the maximum external diameter of the shell 12. The blowing fluid which is admitted via conduit 54 is preferably compressed air.

The transfer unit 55 comprises a transfer arm 56 which is rockable in directions indicated by arrow 56a and reciprocable in directions indicated by arrow 56b. The lower end portion of the arm 56 is pivotally connected to a carriage or slide 58 which is reciprocable along a guide member or rail 59 mounted on the supporting plate 21. The upper end of the arm 56 is bifurcated, as at 57, and is designed to engage the flange 14 of a properly treated parison 11 to transfer such parison into the blowing unit 16.

The Operation

In the first step, the clamping ring 23 is moved to its lower end position so that the ball 27 extends into the lower notch 29 of the hollow shaft 20. The leaf springs 26 (whose lower end portions are anchored in the shaft 20) are then free to move their upper end portions radially outwardly beyond the internal groove 25 of the clamping ring 23 so that the apparatus is ready to permit transfer of a freshly heated parison 11 into the blowing unit 16 or to permit introduction of a fresh parison into the heating unit 15. It is assumed that the heating unit 15 is empty and that the clamping ring 23 is moved to lower end position for the purpose of admitting a fresh prefabricated parison 11 which is introduced in such a way that its flange 14 extends into the groove 24 of the shaft 20, i.e., the freshly admitted parison should be slipped onto the upper part of the shaft. The clamping ring 23 is thereupon returned to its upper end position which is shown in the drawing whereby the groove 25 receives the outermost part of the flange 14 and the upper portions of the leaf springs 26 are caused to move radially inwardly to overlie the flange and to press it against the bottom surfaces in the grooves 24, 25. The parison 11 is thus properly connected to and is ready to rotate with the shaft 20. Radially inward movements of the upper end portions of springs 26 are effected by vertical surfaces flanking the cutouts 27 of the clamping ring 23 when the latter is moved toward the illustrated position in which the ball 27 extends into the notch 28.

In the next step, the prime mover M connected to the shaft carrying the gear 31, as schematically indicated in the drawing, is caused to rotate the gear 31 at a desired (preferably constant) speed so that the gear 31 rotates the gear 30, shaft 20, clamping ring 23, and parison 11. The valve 38a admits overheated steam into the mandrel 35, preferably simultaneously with or shortly after starting of the prime mover, whereby the steam rises in the mandrel 35 and issues through the orifices 39 to heat the shell 12 from inside. The streams of steam flow radially outwardly and impinge against the internal surface of the revolving shell 12. Since the cross-sectional areas of all orifices 39 are not the same, different zones of the shell 12 are heated to different temperatures. Thus, the plasticizing of the parison need not be uniform; such plasticizing depends on the extent to which the corresponding zones of the parison must be expanded in the blowing unit 16. The steam is cooled on contact with the shell 12 and is free to escape by flowing downwardly through the annular clearance 60 between the mandrel 35 and shaft 20 to escape at the lower end of the shaft. Condensate which accumulates on the internal surface of the shell 12 escapes by the same route and effects a desirable cleaning and sterilizing action. It is preferred to admit to the mandrel 35 hot air or another gaseous drying fluid which effects rapid drying of the internal surface of the parison upon completion of the heating action by means of steam. Such hot gaseous fluid can be admitted via conduit 38 and valve 38a or by way of a separate conduit, not shown, which can be connected to the nipple 36 directly to the mandrel 35.

Heating of the shell 12 by steam and thereupon by hot drying gas effects rather negligible heating of the flange 14 because the latter is in surface-to-surface abutment with the shaft 20 and clamping ring 23, and especially because the ring 23 is cooled by fluid which is discharged by the nozzle 44. The nozzle 42 discharges cooling fluid against the outer side of the bottom wall 13 while the orifices 39 discharge steam and/or hot drying gas so that at least the central part of the bottom wall is not subjected to any appreciable heating action.

The delivery of steam and/or drying fluid is preferably timed in a fully automatic way so that it is discontinued after a predetermined interval of time which suffices to effect requisite plasticizing of selected parts of the shell 12. The admission of cooling fluid by way of the nozzle 42 and/or 44 and the rotation of driver gear 31 is preferably terminated in automatic response to termination of admission of drying gas. The clamping ring 23 is thereupon moved to its lower end position so that the springs 26 release the flange 14. The arm 56 is pivoted in a counterclockwise direction to a substantially horizontal position so that its bifurcated end portion 57 registers with the flange 14. The carriage 58 is moved to the left so that the bifurcated portion 57 engages the flange 14. In the next-following step, the arm 56 is caused to pivot through an angle of 180° (in a clockwise direction) while the carriage 58 travels in a direction to the right whereby the heat-treated parison 11 enters the mold cavity 50a by way of the opening 53 to assume the phantom-line position 11' in which the flange 14 rests on the top surfaces of the mold sections 50. The arm 56 is thereupon withdrawn slightly in a direction to the left so that the flange 14 is disengaged from the end portion 57 and its underside can descend into full surface-to-surface abutment with the closed mold. The blowing head 51 is then caused to descend to the position which is shown in the drawing and the stretching ram 52 is caused to move downwardly to effect preliminary elongation of the parison (11'). At the same time, the conduit 54 admits blowing fluid which causes the parison to expand and to be converted into the article 10. When the article 10 sets, the mold is opened by moving the sections 50 apart and the finished product is expelled or withdrawn from the mold in a manner well known from the art of blow molding.

An important advantage of internal heating of parisons 11, particularly with overheated steam, is that the interior of each parison is cleaned and sterilized in automatic response to localized or complete plasticizing so that the finished articles need not be subjected to a renewed sterilizing and/or cleaning action. This is of importance when the articles 10 are intended for storage of goods which are likely to spoil in the absence of proper sterilization or cleaning of their containers. Since the orifices 39 can discharge steam and/or another heating medium at a desired pressure, the heating action can be completed rapidly so that the apparatus can turn out a substantial number of articles 10 per unit of time. Such rapid heating of the parisons is further desirable because it prevents the formation of monomers in the polymeric synthetic plastic material and decomposition of molecules. Accurately measured amounts of heating medium can be directed against predetermined portions of the parisons 11 by proper selection of the number and/or cross-sectional areas of orifices 39, by proper selection of speed of the shaft 20 and the length of intervals during which the shaft rotates with the parison, and/or by properly selecting the pressure and temperature of the medium which is admitted into the mandrel 35. Additional possibilities of regulating the heating action will be discussed hereinafter. The flange 14 is preferably shielded from excessive heat, especially if it is to engage with a cap, plug or another part which seals the open end of the finished article. The final shape of such flange is then determined during injection molding, i.e., during the formation of the respective parison. The nozzle 42 insures that the boundary between the heated and cooled portions of the bottom wall 13 is very pronounced. It is clear that the heating unit 15 can be provided with more than one nozzle which discharges cooling fluid directly against the revolving parison. For example, a second nozzle 42 could be installed to cool the lowermost part of the shell 12.

The improved apparatus is susceptible of many modifications without departing from the spirit of my invention. For example, the upper portion of the mandrel 35 can be of conical shape so that its external surface is parallel to the internal surface of a parison 11 which is held by the springs 26. Also, the mandrel 35 can be provided with a single orifice 39 or with a limited number of such orifices and the heating unit 15 may be provided with reciprocating means (not shown) for moving the mandrel 35 up and down (arrow 61) to thereby heat a predetermined part of a properly mounted parison. The reciprocating means may be provided with a speed regulating device which can determine the speed of the mandrel and the duration of dwells in certain axial positions of the mandrel. Such arrangement enables the operators to subject selected portions of a revolving parison to different heating actions. It is also possible to employ a stationary holding component for the parisons and to rotate the mandrel 35 with reference to such holding component. Still further, the mandrel can rotate simultaneously with the shaft 20 and clamping ring 23 but at a different speed and/or in a different direction.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In an apparatus for conversion of synthetic thermoplastic parisons into hollow articles, particularly in a blow-molding apparatus, a combination comprising a parison holding component comprising a hollow shaft; a heating medium supplying component arranged to extend with clearance into a parison which is carried by said holding component and comprising a hollow mandrel extending axially into said shaft and having at least one orifice arranged to discharge a heating medium against the inner surface of a parison which is carried by said hollow shaft; means for delivering the heating medium to said hollow mandrel, said mandrel and said shaft defining between themselves an annular clearance for evacuation of spent heating medium; and drive means for moving at least one of components with reference to the other component while said orifice discharges heating medium.

2. In an apparatus for conversion of synthetic thermoplastic parisons into hollow articles, particularly in a blow-molding apparatus, a combination comprising a parison holding component; a heating medium supplying component arranged to extend with clearance into a parison which is carried by said holding component and comprising a hollow mandrel which is provided with a plurality of orifices arranged to discharge the heating medium against the inner surface of a parison which is carried by said parison holding component; means for delivering the heating medium to said supply component; means for throttling the flow of heating medium to at least one of said orifices and comprising a pin extending transversely across the interior of said mandrel between a selected pair of said orifices; and drive means for moving at least one of said components with reference to the other component while said orifices discharge heating medium.

3. A combination as defined in claim 1, wherein said orifice is arranged to discharge heating medium substantially radially of said mandrel.

4. A combination as defined in claim 1, wherein said supplying component is provided with a plurality or orifices.

5. A combination as defined in claim 4, wherein said hollow mandrel has a portion extending into the interior of the parison which is carried by said holding component, said orifices being provided in said portion of said mandrel.

6. A combination as defined in claim 4, wherein at least one of said orifices is a slot.

7. A combination as defined in claim 6, wherein said slot is inclined with reference to the axis of said mandrel.

8. A combination as defined in claim 4, wherein several of said orifices are slots and wherein said slots are of identical width.

9. A combination as defined in claim 8, wherein at least one of said slots has a length which is different from the length of at least one other slot.

* * * * *